United States Patent [19]

Spencer et al.

[11] Patent Number: 5,687,987
[45] Date of Patent: Nov. 18, 1997

[54] AIR BAG MODULE WITH CLAMSHELL COVER

[75] Inventors: Graham Thornton Spencer, Tipp City; Margaret Ann Fisher, Dayton; James Lloyd Webber, Centerville; John Paul Sparkman, Dayton, all of Ohio

[73] Assignee: General Motors Corporation, Detroit, Mich.

[21] Appl. No.: 609,061

[22] Filed: Feb. 29, 1996

[51] Int. Cl.⁶ .................................................. B60R 21/20
[52] U.S. Cl. ........................ 280/728.2; 280/728.3; 280/730.2; 280/736
[58] Field of Search .......................... 280/728.3, 728.2, 280/730.2, 730.1, 732, 736, 740, 741, 742, 743.1, 728.1

[56] References Cited

U.S. PATENT DOCUMENTS

| | | | |
|---|---|---|---|
| 3,666,289 | 5/1972 | Magyar | 280/740 |
| 3,690,695 | 9/1972 | Jones, Sr. | 280/741 |
| 3,887,214 | 6/1975 | Brawn | 280/730.1 |
| 4,536,008 | 8/1985 | Brown, Jr. | 280/730.1 |
| 5,112,079 | 5/1992 | Haland et al. | 280/730.2 |
| 5,322,322 | 6/1994 | Bark et al. | 280/730.2 |
| 5,498,030 | 3/1996 | Hill et al. | 280/743.1 |
| 5,533,750 | 7/1996 | Karlow et al. | 280/728.2 |
| 5,553,887 | 9/1996 | Karlow et al. | 280/728.3 |

FOREIGN PATENT DOCUMENTS 2281259  3/1995  United Kingdom ............ 280/741

*Primary Examiner*—Brian L. Johnson
*Assistant Examiner*—Peter C. English
*Attorney, Agent, or Firm*—Kathryn A. Marra

[57] ABSTRACT

An air bag module includes an inflator for generating gas and an air bag deployable upon generation of gas by the inflator. The air bag module further includes a canister for housing the inflator and a clamshell cover for housing the air bag. The clamshell cover is attached to the canister. Preferably, the clamshell cover includes first and second halves and a bendable thin hinge portion pivotally connecting the first and second halves. Upon air bag deployment, the air bag breaks open and deploys out through the hinge portion of the clamshell cover.

9 Claims, 7 Drawing Sheets

AIR BAG MODULE WITH CLAMSHELL COVER

This invention relates to an air bag module for use in a vehicle.

BACKGROUND OF THE INVENTION

Conventional air bag module designs require a rigid housing or base structure which is anchored to a vehicle body and which houses and supports an inflator and a folded air bag. The housing typically includes a housing opening through which the air bag deploys. The housing is typically formed of a sturdy rigid material, such as a heavy plastic or stamped, drawn or cast metal. The air bag module also typically includes a plastic or molded cover door which overlies the folded air bag and the housing opening. The cover door typically includes weakened tear seams which break open to permit deployment of the air bag therethrough. In the prior art, the cover is molded to its desired final shape for covering the air bag and for attachment to the housing. Thus, prior art air bag covers are sometimes difficult to manufacture when the molded shape of the cover includes complex curvatures resulting in a cover which is difficult to remove from the mold. In addition the prior art covers are difficult to stretch over the air bag and around or within a housing or base structure for attachment thereto.

At the same time many air bag modules are being contemplated for use in vehicle locations having narrow space constraints, such as vehicle seats, doors, roofs or other side structure. Thus, it is continually desirable to reduce the size and weight of the air bag module to improve packaging.

SUMMARY OF THE INVENTION

This invention provides an improved air bag module which is easy to manufacture and assemble, which is lightweight, and which preferably has a minimal width making it easily adaptable for packaging in a vehicle. The air bag module preferably includes a cover having a shape which is easy to manufacture by molding and easily removable from the mold. This invention preferably provides an air bag module which is particularly well-adapted for use in vehicle locations with narrow packaging constraints, such as a vehicle seat, door, roof or other side structure.

These advantages are accomplished in a preferred embodiment of the invention by providing an air bag module including an inflator for generating gas, an air bag deployable upon generation of gas by the inflator, a canister for housing the inflator, and a clamshell cover for housing the air bag. The clamshell cover is attached to the canister.

Preferably, the clamshell cover includes first and second halves and a bendable thin hinge portion pivotally connecting the first and second halves. Preferably, the first and second halves of the clamshell cover each include a mounting edge opposite the hinge portion. The mounting edges are preferably securely connected to each other such that upon air bag deployment, the air bag breaks open and deploys out through the hinge portion of the clamshell cover and the mounting edges remain secured to each other.

Preferably, the clamshell cover is integrally formed as one piece including the first half, the second half and the hinge portion. Preferably, the clamshell cover is molded with the first and second halves extending outward from the hinge portion in a generally planar, open condition and the first and second halves are foldable about the hinge portion to move the clamshell cover to a closed condition in which the first and second halves are positioned atop each other. Also preferably, the canister includes opposing arms for clamping the first and second halves of the clamshell cover together.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
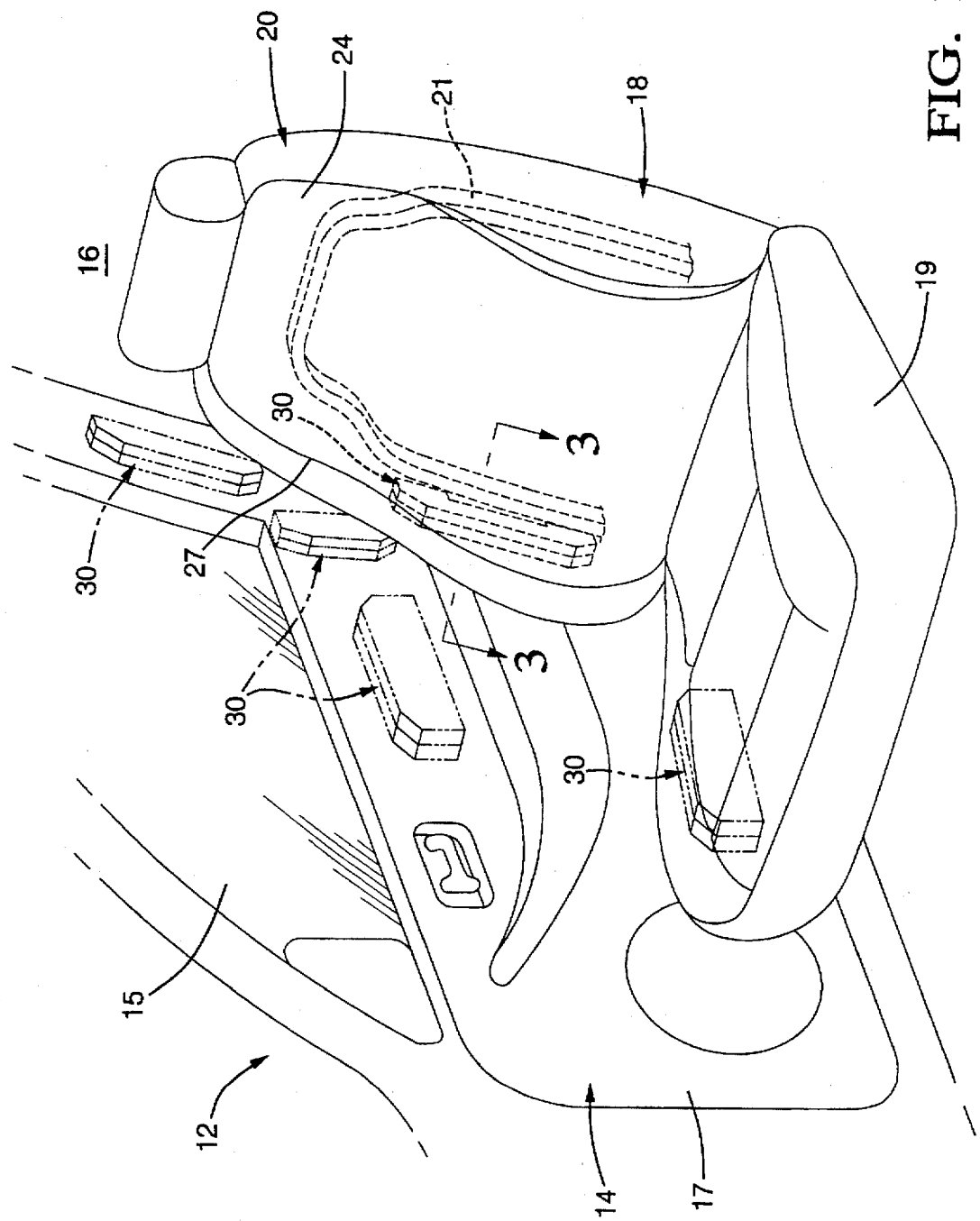
FIG. 1 is a perspective view of a vehicle interior partially broken away and including an air bag module in an undeployed condition located in a seat.

Referring to FIG. 1, it is seen that a vehicle 12 includes a door 14 having a movable window 15 mounted thereon. An interior 16 of the vehicle 12 includes an inner door panel 17 and a seat 18 for a vehicle occupant (not shown), the seat 18 having a seat bottom 19 and an upper seat back 20. The seat back 20 includes a rigid seat frame 21, preferably being metal, and encompassed within the seat back 20. The seat back 20 is preferably formed of a foam material 23 covered by fabric seat material 24. The seat back 20 preferably includes a vertically extending frangible seat seam 27 proximate the inner door panel 17.

Figure 4:
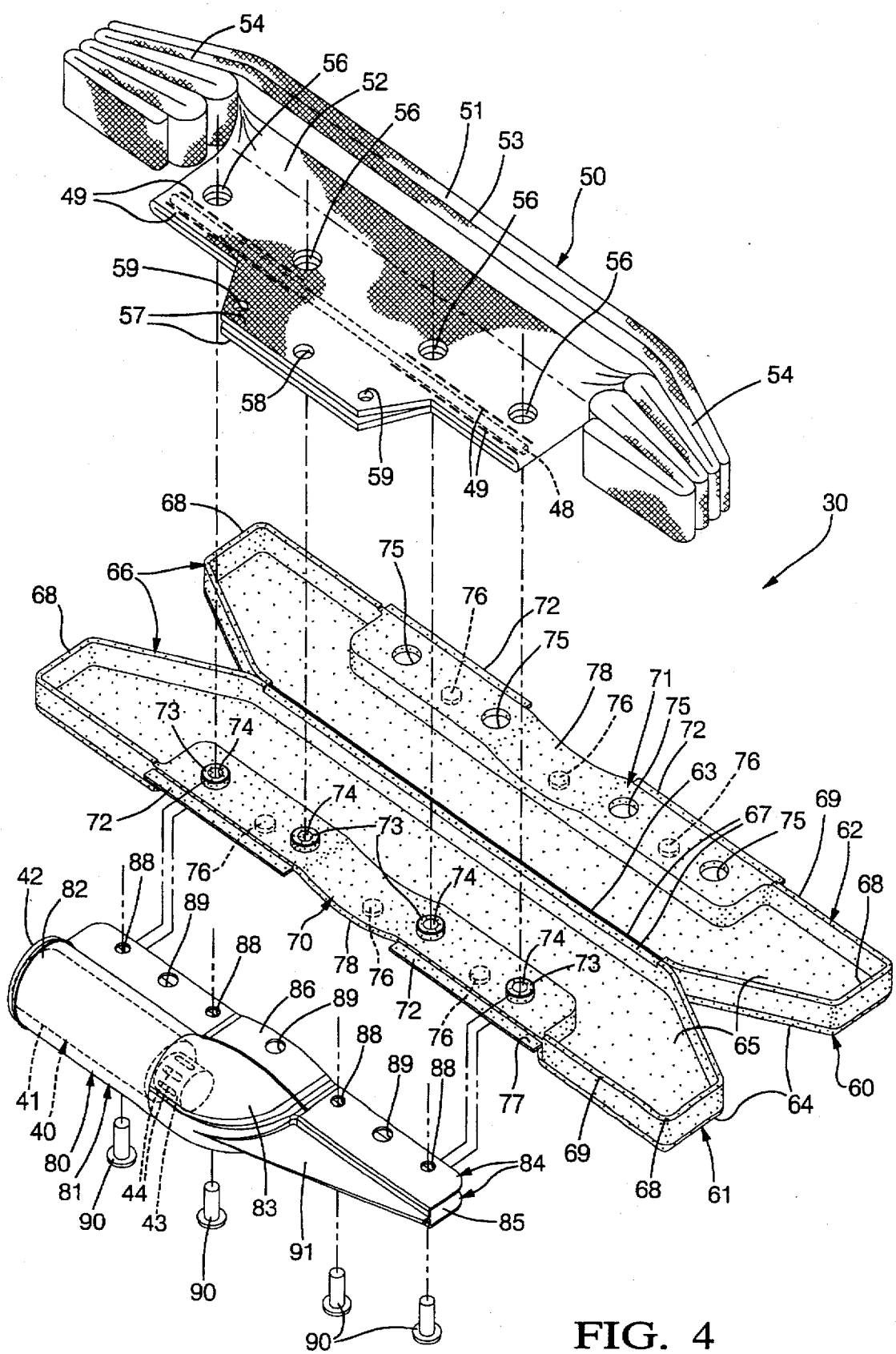
FIG. 4 is an exploded perspective view of the air bag module.

FIG. 4 best illustrates the component parts of a complete air bag module 30 located within the seat back 20. The module 30 includes a canister 80, a clamshell cover 60, an inflator 40 mounted within the canister 80, an air bag 50 for inflation upon generation of gas by the inflator 40, and a plurality of canister fasteners 90, such as rivets, for connecting the canister 80 to the air bag 50 and clamshell cover 60, as described further hereinafter.

As best shown in FIGS. 4–6 and 8, the inflator 40 may be of any conventional construction which contains chemicals for igniting to generate gas for discharge upon the existence of predetermined vehicle 12 conditions. The inflator 40 preferably has a hybrid construction including an axially elongated cylindrical inflator body 41 having a mounting end 42 and an opposite discharge end 43 including ports 44 through which inflator gas is discharged in a thrust neutral manner to inflate the air bag 50.

Figure 2:
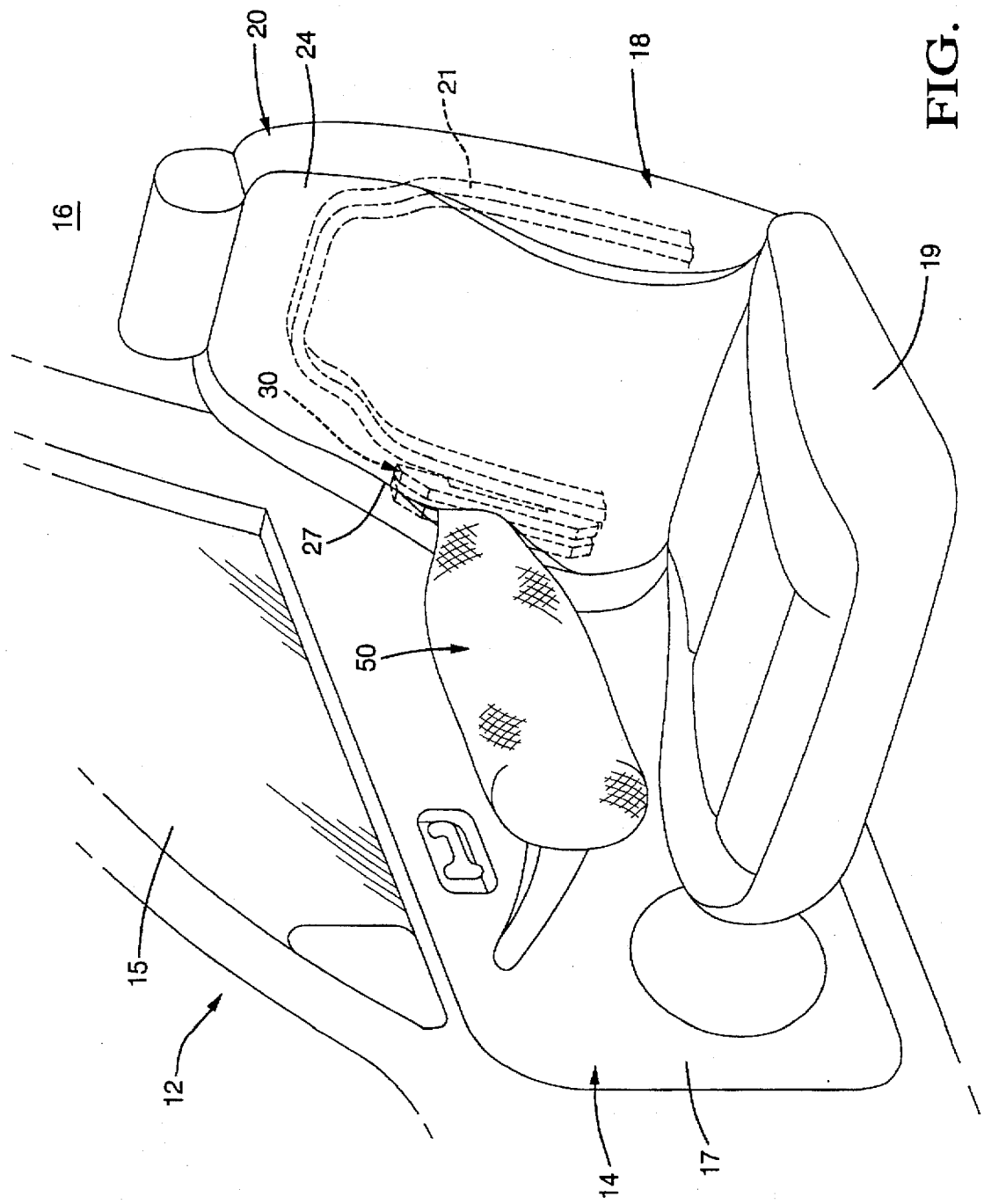
FIG. 2 is a view similar to FIG. 1 but showing the air bag module in a deployed condition.

As best shown in FIG. 4, the air bag 50 is made of any conventional fabric material which is suitable for air bag construction. The air bag 50 includes the folded main body portion 51 which is inflatable upon the discharge of inflator gas. The main body portion 51 preferably includes a central fold portion 53 and end fold portions 54 which are all oriented laterally on the module 30 for deployment in a forwardly direction. The fold portions 53, 54 are preferably folded in an accordion-like manner, but other fold arrangements designed to conform to the shape of the clamshell cover 60 are also contemplated. While the air bag 50 is shown in FIG. 2 as an elongated air bag 50 positioned for protecting the torso portion of the occupant (not shown), it will be appreciated that the air bag 50 may also be positioned higher in the seat back 20 to protect the head portion of the occupant or may have a greater lateral length for protection of both the torso and head portion of the occupant.

As best shown in FIG. 4, the air bag 50 also includes a neck portion 52 preferably being an extension of the air bag fabric material. The neck portion 52 defines an air bag opening 55, best shown in FIG. 5, through which inflator gas is received to inflate the air bag 50. The neck portion 52 includes a first set of fastener apertures 56 therein matably aligned for receiving the canister fasteners 90 therethrough as described further hereinafter.

Figure 5:
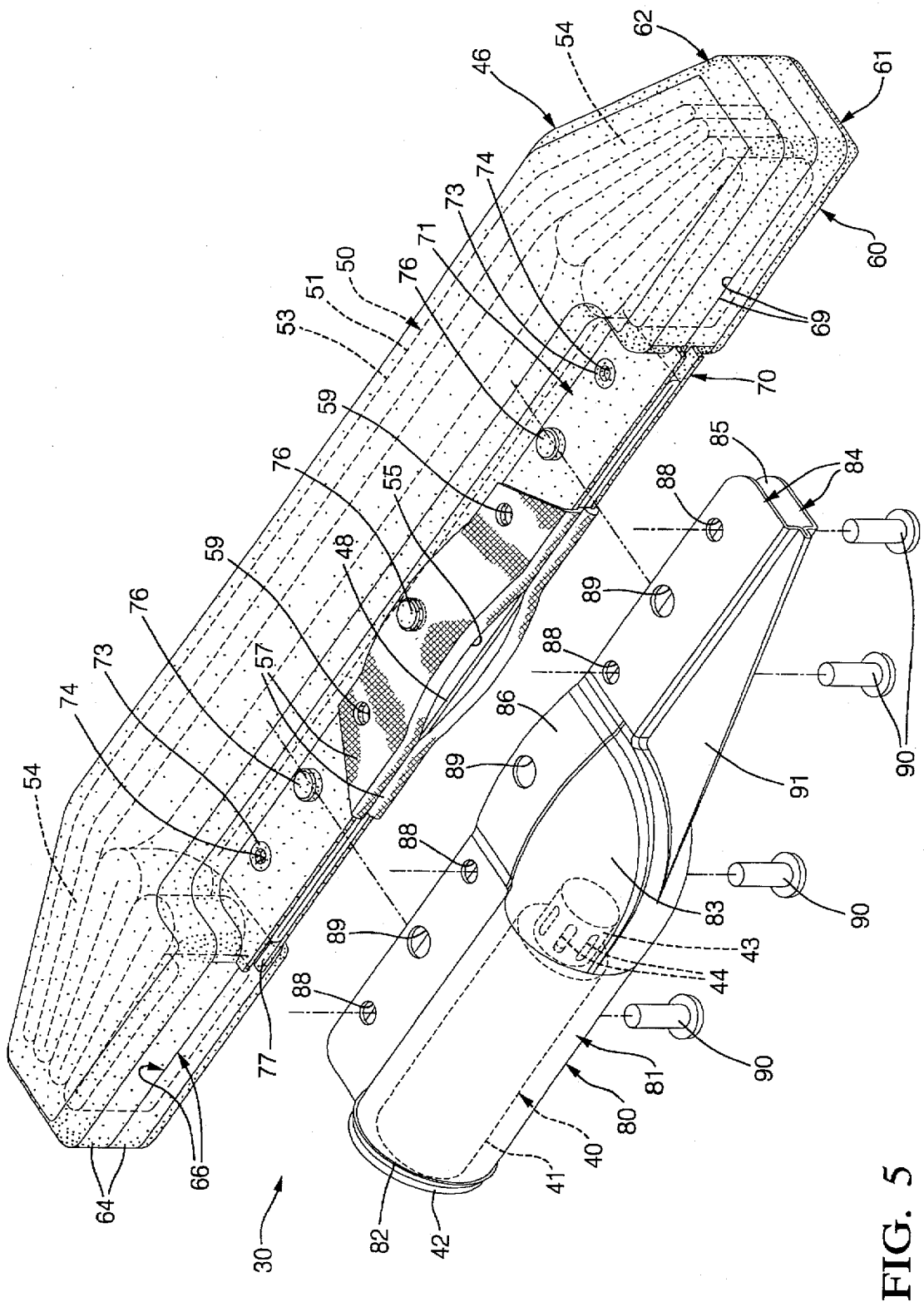
FIG. 5 is a perspective view similar to FIG. 4, but showing the air bag module in a partially assembled condition.
Figure 8:
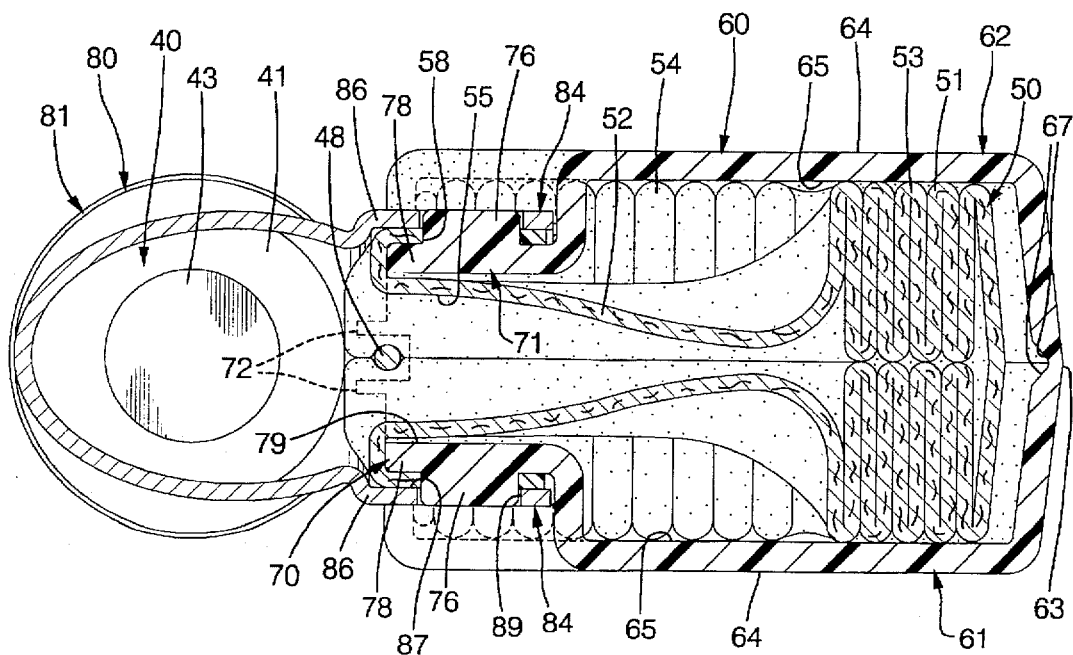
FIG. 8 is a section as viewed along line 8—8 of FIG. 6.

As best shown in FIGS. 4, 5, and 8, the air bag 50 further includes attachment flaps 57 which extend out through and wrap around the clamshell cover 60 when the air bag 50 is assembled therein. The flaps 57 are preferably shown as having a lateral length less than the neck portion 52, however, the flaps 57 may also extend the entire length of the neck portion 52. The flaps 57 and the neck portion 52 cooperatively define the air bag opening 55 through which inflator gas is received to inflate the air bag 50. The flaps 57 each include a second set of fastener apertures 59 for receipt of the canister fasteners 90 therethrough to attach the flaps 57 to the clamshell cover 60. The flaps 57 also include a first set of alignment apertures 58 therein which are preferably centrally located on the flaps 57 for alignment and attachment on the clamshell cover 60 during assembly as described further hereinafter. As best shown in FIG. 8, the flaps 57 also cooperatively prevent inflator gas from escaping outside of the clamshell cover 60 during inflation, as described below. The air bag 50 including the main body portion 51, the neck portion 52, and the flaps 57 may be made of a single piece of fabric or of several fabric panels joined together.

A mounting bar 48 is preferably secured within the neck portion 52 of the air bag 50 adjacent the flaps 57. The air bag 50 includes seams 49 sewn on opposing sides of the mounting bar 48 such that the mounting bar 48 is securely held in place on the neck portion 52 of the air bag 50. The mounting bar 48 forms a thickened portion on the air bag 50 that helps to secure the air bag 50 to the clamshell cover 60 and canister 80 of the module 30 in addition to the canister fasteners 90. The mounting bar 48 advantageously distributes the loads during air bag inflation across substantially the entire lateral length of the neck portion 52 of the air bag 50 during inflation. As best shown in FIG. 4, it will be appreciated that the mounting bar 48 preferably extends substantially the entire lateral length of the neck portion 52 of the air bag 50 and thus extends through the air bag opening 55. However, the presence of the mounting bar 48 does not significantly interfere with the passage of inflator gas through the air bag opening 55 during inflation. While the mounting bar 48 is preferably handled as one piece for ease of assembly, it will further be appreciated that the mounting bar 48 could also be two pieces, each preferably located on opposing lateral sides of the air bag opening 55. It will be appreciated that the mounting bar 48 may also be more than two pieces or that the mounting bar 48 may be eliminated and traditional fasteners may be used to attach the air bag 50 to either one or both of the clamshell cover 60 and canister 80.

The module 30 further includes a foldable clamshell cover 60 which houses the folded air bag 50 prior to air bag deployment. As shown in FIG. 4, the clamshell cover 60 includes a first half 61 and a second half 62 and an integral, bendable thin hinge portion 63 pivotally connecting the first and second halves 61, 62 prior to air bag deployment. Advantageously, the hinge portion 63 also dually serves as a breakable tear seam through which the air bag 50 deploys, as described further below.

Referring to FIG. 4, the clamshell cover 60 has a generally planar, open condition in which the first and second halves 61, 62 each extend outwardly from the hinge portion 63. The first and second halves 61, 62 are pivotally connected by the hinge portion 63 and the hinge portion 63 preferably permits pivotal movement of the first and second halves 61, 62 approximately 180 degrees relative each other. Thus, the clamshell cover 60 is foldable to a closed condition in which the first and second halves 61, 62 are positioned atop each other as shown in FIGS. 3 and 5–8.

The clamshell cover 60 has an outer surface 64 and an inner surface 65. The first and second halves 61, 62 of the clamshell cover 60 each preferably have a generally rectangular shape defined by perimetric edges 66 including hinged edges 67 integrally attached to the hinge portion 63, free side edges 68 and mounting edges 69. The first and second halves 61, 62 preferably include first and second thickened mounting portions 70, 71, respectively, having inset flanges 72 thereon sized for capturing the mounting bar 48 of the air bag 50 therein, as described further below.

Preferably, the inner surface 65 of the first mounting portion 70 includes a plurality of outwardly projecting knobs 73 spaced laterally apart adjacent the mounting edge 69. The knobs 73 each preferably include a third set of fastener apertures 74 therethrough for receiving the canister fasteners 90 therein. Preferably, the second half 62 of the clamshell cover 60 includes knob apertures 75 for matable alignment with the knobs 73. The knob apertures 75 correspond in size and number for closely receiving the knobs 73 therein by snap-fitted or press-fitted attachment when the first and second halves 61, 62 are folded atop each other and the clamshell cover 60 is in the closed condition. The knob apertures 75 are matably alignable with the first and second set of fastener apertures 56, 59 on the air bag 50 when the air bag 50 is assembled to the clamshell cover 60.

The clamshell cover 60 also includes a plurality of alignment bosses 76 laterally spaced apart on the outer surface 64 of the mounting portions 70, 71 of the first and second halves 61, 62. The alignment bosses 76 are used to attach and align the air bag flaps 57 and the canister 80 with the clamshell cover 60 during assembly.

The entire clamshell cover 60 is preferably integrally molded as a single component from a suitable polymeric material. Preferably, the clamshell cover 60 is molded as a single component in the open condition as shown in FIG. 4. Advantageously, the clamshell cover 60 is easily removable from molding due to its generally planar halves 61, 62 interconnected by the bendable hinge portion 63. The clamshell cover 60 is also easily removable due to its relatively straight perimetric edges 66.

Referring to FIGS. 4 and 5, the air bag 50 is assembled to the clamshell cover 60 as follows. The clamshell cover 60 is placed in the open condition and the first set of fastener apertures 56 on the neck portion 52 are matably aligned with the knobs 73 and the folded air bag 50 is easily placed within the first half 61 of the clamshell cover 60. The knobs 73 are pushed through the first set of fastener apertures 56 to align the air bag 50 relative the clamshell cover 60. It will be appreciated that the folded air bag 50 is easily placed within the clamshell cover 60 in the open condition since the hinge portion 63 enables the first and second halves 61, 62 to be opened 180 degrees apart in a generally planar condition. The air bag 50 is positioned in the first half 61 of the clamshell cover 60 with the mounting bar 48 positioned atop the flange 72 of the first half 61 of the clamshell cover 60.

Next, the second half 62 of the clamshell cover 60 is simply folded over approximately 180 degrees and positioned atop the first half 61 as shown in FIG. 5. The knob apertures 75 on the second half 62 of the clamshell cover 60 are matably aligned with the knobs 73 such that the knobs 73 are snap-fitted or press-fitted into engagement with the knob apertures 75 to maintain the clamshell cover 60 in a closed condition. In the closed condition, the air bag 50 is trapped between the mounting portions 70, 71 of the first and second halves 61, 62 of the clamshell cover 60 and hooked onto the knobs 73 such that the air bag 50 is held and positioned within the clamshell cover 60. Also in the closed condition, the clamshell cover 60 substantially encapsulates the air bag 50 and prevents entry of foreign articles into the module 30.

Figure 7:
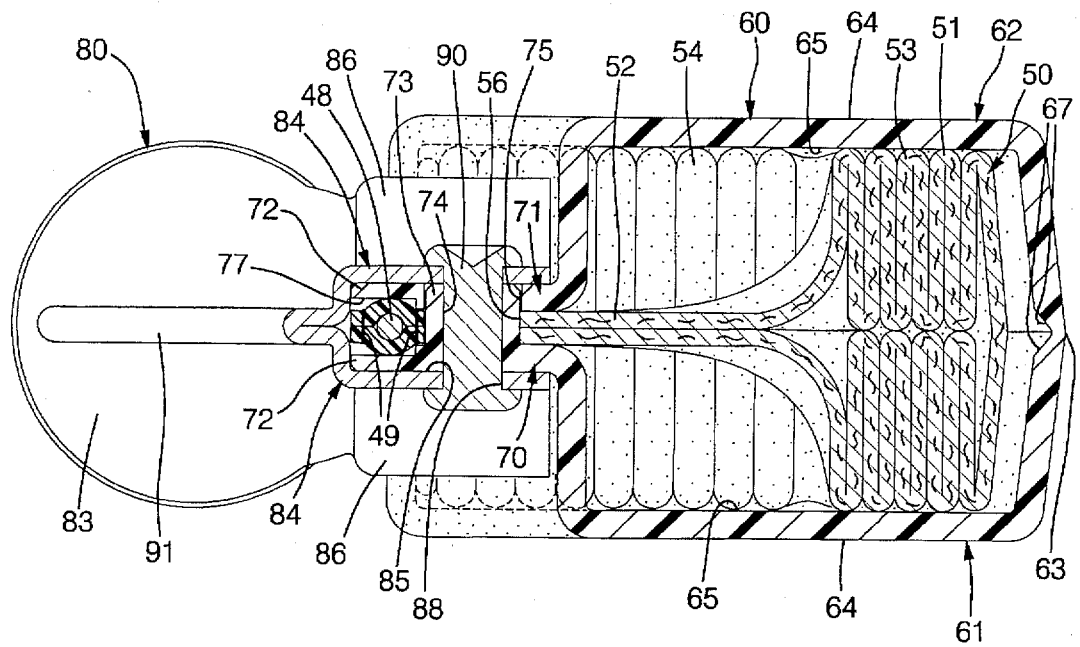
FIG. 7 is a section as viewed along line 7—7 of FIG. 6.

In the closed condition as best shown in FIG. 7, the flanges 72 of the first and second halves 61, 62 cooperatively define a shelf 77 extending substantially the length of the mounting portions 70, 71 and the mounting bar 48 is captured within the shelf 77 defined by the flanges 72. Referring to FIGS. 4 and 5, the respective perimetric edges 66 including the hinged, side and mounting edges 67, 68, 69 of the first and second halves 61, 62 are aligned with each other and abut each other when the clamshell cover 60 is in the closed condition.

When the clamshell cover 60 is in the closed condition, the mounting portions 70, 71 of the first and second halves 61, 62 each include an arcuate clamshell portion 78 which cooperatively define a clamshell opening 79. It will be appreciated that the flaps 57 of the air bag 50 extend out from between the mounting edges 69 of the clamshell cover 60 in the closed condition. Next in the assembly, the flaps 57 are simply wrapped around the outer surface 64 of the clamshell cover 60 and the respective alignment bosses 76 are pushed through the first set of alignment apertures 58 in the flaps 57 to maintain the flaps 57 in an open condition. Thus, the flaps 57 and the clamshell opening 79 cooperatively define the shape of the air bag opening 55 though which inflator gas is received to inflate the air bag 50. Also, knob apertures 75 become aligned with the first and second set of fastener apertures 56, 59 for receiving the canister fasteners 90 therethrough later in the assembly process.

When the air bag 50 is assembled to the clamshell cover 60, the mounting bar 48 is caught beneath the shelf 77 formed by the flanges 72 of the mounting portions 70, 71 of the first and second halves 61, 62. The mounting bar 48 extends through the air bag opening 55, but does not significantly interfere with the passage of inflator gas therethrough. The clamshell cover 60 and the air bag 50 with the mounting bar 48 therein provide a clamshell subassembly 46 which is maintained in the assembled condition by engagement of the knobs 73 on the first half 61 with the first and second set of fastener apertures 56, 59 and the knob apertures 75 and by engagement of the alignment bosses 76 with the first set of alignment apertures 58. Advantageously, the entire clamshell subassembly 46 is assembled without the use of fasteners. It will be appreciated that the knobs 73 and knob apertures 75 may alternately be on the opposite halves 61, 62 of the clamshell cover 60.

The module 30 further includes a canister 80 for housing the inflator 40 and for directing inflator gas into the air bag 50. The canister 80 also is used to securely clamp the mounting edges 69 of the clamshell cover 60 in the closed condition. The canister 80 is preferably formed of a relatively strong and rigid material, preferably being metal. The canister 80 includes a tubular portion 81 sized for closely receiving the inflator 40 therein. The tubular portion 81 has a first end 82 for receiving the inflator 40 therein and a curved second end 83 for mating with and directing inflator gas into the air bag opening 55. The inflator body 41 of the inflator 40 is laterally oriented relative the module 30 and the tubular portion 81 of the canister 80 directs the inflator gas in a forwardly direction for receipt into the air bag opening 55.

The canister 80 further includes a pair of opposing clamping arms 84 extending substantially across the lateral length of the canister 80 and cooperatively defining a U-shaped slotted opening 85 sized for closely receiving the mounting portions 70, 70, 71 of the clamshell cover 60 therein. The arms 84 preferably are slightly flexible for clamping the clamshell cover 60 and air bag 50 therebetween. The arms 84 preferably have a lateral length approximately equal to the lateral length of the mounting portions 71 of the clamshell cover 60. The arms 84 also each include an arcuate arm portion 86 which cooperatively define a canister opening 87 at the second end 83 of the tubular portion 81. The arcuate arm portions 86 are sized and aligned for receiving arcuate clamshell portions 78 and air bag opening 55 therein. The arms 84 each further include a fourth set of fastener apertures 88 matably aligned with the first, second and third set of fastener apertures 56, 59, 74 and sized for receiving the canister fasteners 90 therethrough. The arms 84 each further include a second set of alignment apertures 89 sized for receiving the alignment bosses 76 therethrough to align the canister 80 relative the clamshell cover 60 prior to insertion of the canister fasteners 90. The canister 80 may further include a support rib 91 extending between the tubular portion 81 and the arms 84. While the canister 80 is preferably shown as one integral component, it will be appreciated that the canister 80 may also be constructed from multiple pieces such as two halves welded together.

Figure 6:
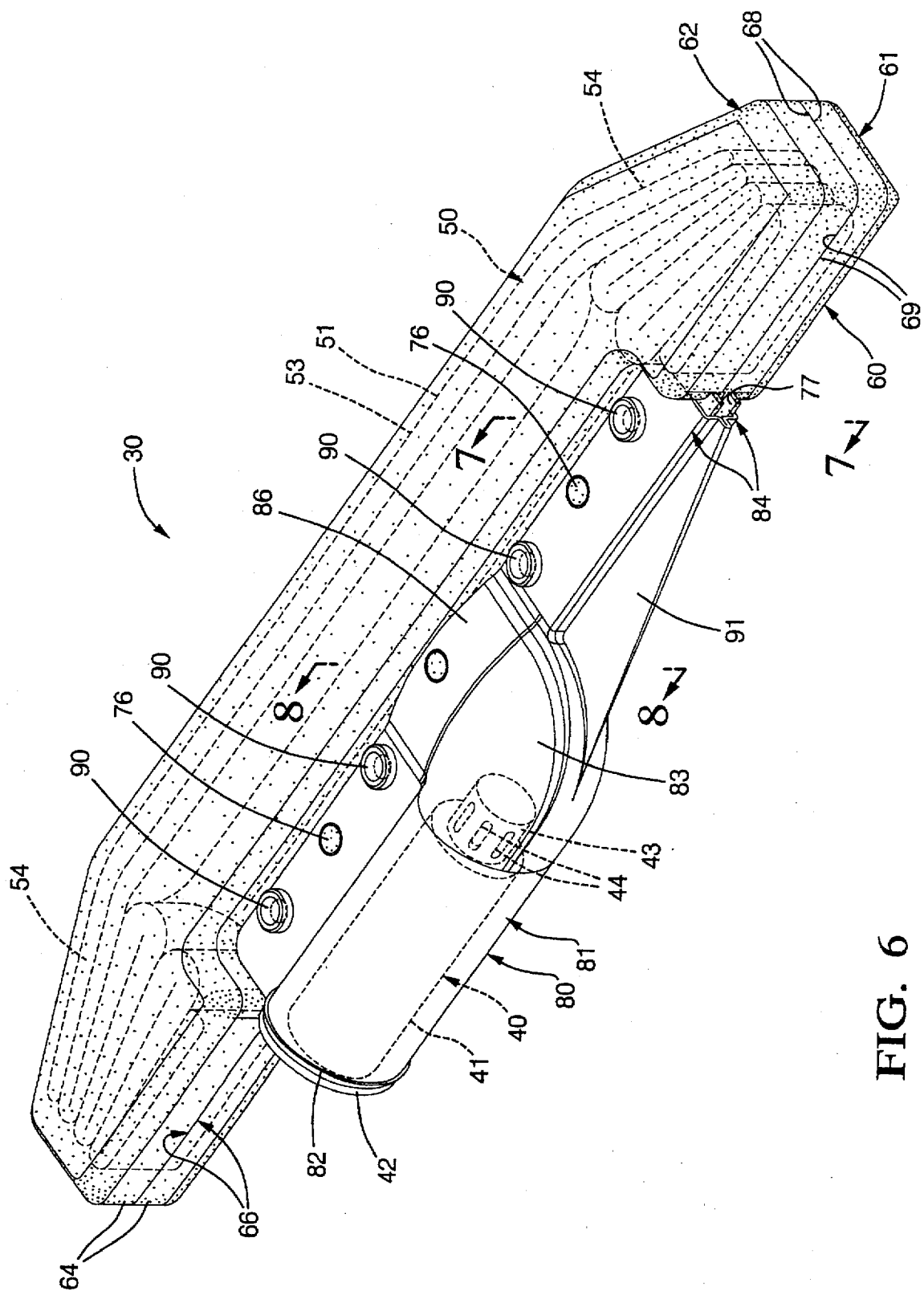
FIG. 6 is a perspective view similar to FIG. 5, but showing the air bag module in the fully assembled condition.

As best shown in FIGS. 5 and 6, the remainder of the module 30 is assembled as follows. The clamshell subassembly 46 is assembled to the canister 80 by aligning the second set of alignment apertures 89 on the arms 84 of the canister 80 with the alignment bosses 76 and pushing the alignment bosses 76 therethrough by slip-fitted or press-fitted engagement to align the canister 80 with the clamshell cover 60. Next, the canister fasteners 90, preferably being rivets, are inserted through and secured within the knob apertures 75 and the first, second, third and fourth set of fastener apertures 56, 59, 74, 88. The arms 84 of the canister 80 with the canister fasteners 90 inserted therethrough are pressed towards each other and securely close the mounting portions 70, 71 of the clamshell cover 60 and securely anchor the neck portion 52 and flaps 57 of the air bag 50 to the canister 80.

Advantageously, the inflator 40 may preferably be added as the last component to the module 30. The inflator 40 is simply axially inserted into the first end 82 of the tubular portion 81 of the canister 80 until the mounting end 42 of the inflator 40 engages the first end 82 of the tubular portion 81. Many retention methods may be used for maintaining the inflator 40 within the tubular portion 81 such as a press fit, a snap-fit with the tubular portion 81 including tabs for snap-fitted attachment with a groove (not shown), lip or other mating feature on the inflator 40 or a separate retention device to clamp or secure the inflator 40 within the tubular portion 81.

In the assembled condition shown in FIGS. 6–8, it will be appreciated that the mounting bar 48 in the air bag 50 is securely trapped in the shelf 77 formed by the flanges 72 of the mounting edges portions 70, 71 of the clamshell cover 60 and also is securely trapped beneath the canister fasteners 90 to securely anchor the air bag 50 to the canister 80 and clamshell cover 60 during air bag deployment. It will further be appreciated that the arms 84 with the plurality of canister fasteners 90 therethrough cooperatively clamp the first and second halves 61, 62 of the clamshell cover 60 together.

Figure 3:
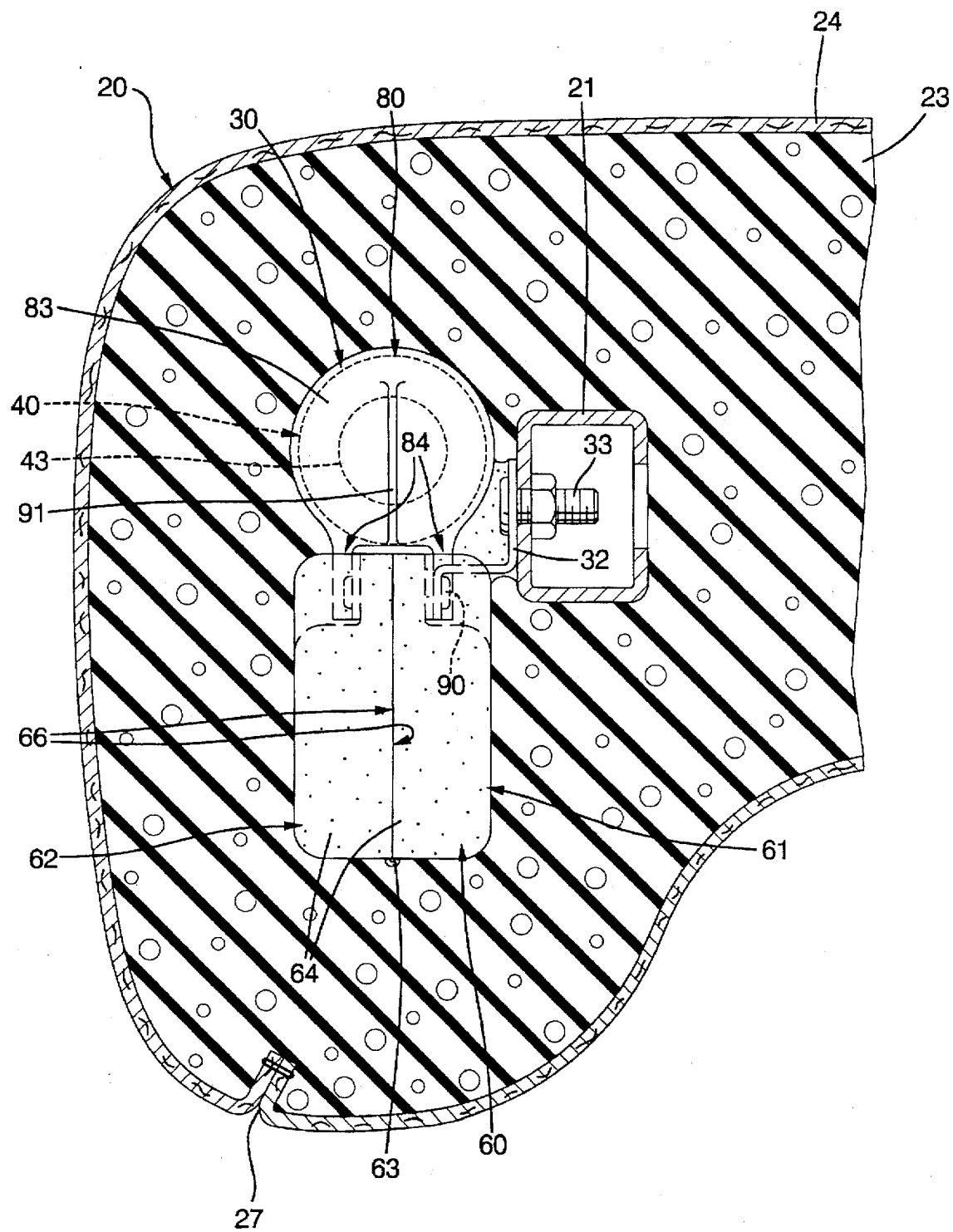
FIG. 3 is a section as viewed along line 3—3 of FIG. 1 and showing the air bag module in the undeployed condition.

As best shown in FIG. 1, the module 30 may be attached to any suitable vehicle 12 structure and is particularly well-adapted for use in narrow vehicle locations with limited width such as the seat back 20, seat bottom 19, door 14 or other side or roof structure. The module 30 is preferably attached to the seat frame 21 of the seat back 20. As shown in FIG. 3, the module 30 may include a laterally extending bracket 32 suitably attached at one end to the canister 80 or the inflator 40 and at another end to any suitable vehicle 12 structure, such as the seat frame 21. Thus, the entire module 30 can be easily removably mounted on the vehicle 12 by the use of the bracket 32 and one or more mounting fasteners 33, such as by a bolt and nut.

Upon the sensing of predetermined vehicle 12 conditions, the inflator 40 generates inflator gas out through the ports 44 on the discharge end 43 and into the tubular portion 81 of the canister 80. Referring to FIG. 8, the inflator gas is directed into the air bag opening 55 by the curved second end 83 of the canister 80. The inflator gas is received within the air bag opening 55 and begins to fill the main body portion 51 of the air bag 50. The flaps 57 prevent the escape of inflator gas out through the clamshell cover 60 by sealing the path between the clamshell cover 60 and the canister 80. The inflating air bag 50 breaks open the hinge portion 63 of the clamshell cover 60 and deploys out through the hinge portion 63 between the first and second halves 61, 62 of the clamshell cover 60 to the fully inflated condition shown in FIG. 2. Thus, it will be appreciated that the hinge portion 63 advantageously serves as the bendable hinge portion 63 about which the first and second halves 61, 62 of the air bag 50 pivot for easy manufacture of the clamshell cover 60 and easy installation of the air bag 50. In addition, the hinge portion 63 advantageously serves a dual purpose as a tear seam of the clamshell cover 60 through which the air bag 50 deploys. During deployment, the air bag 50 and clamshell cover 60 are both securely anchored to the canister by the clamping arms of the canister 80 which are locked down by the canister fasteners 90. The clamping arms 84 advantageously distribute the loads from the inflating air bag 50 across the lateral length of the canister 80, air bag 50, and clamshell cover 60.

It will be appreciated that the width of available inflators 40 dictates the minimum width of the module 30. Thus, the present invention provides a module 30 that is approaching the minimum width achievable by providing a canister 80 that closely captures the inflator 40 therein and a clamshell cover 60 that is approximately equal to the width of the canister 80. However, it will be appreciated that the clamshell cover 60 can also have a width which is greater than the canister 80 width if packaging or air bag 50 size dictates that it would be more convenient. Alternately, the clamshell cover 60 may have width that is less than the width of the canister 80 and also preferably a lateral length that is greater than the canister 80 so that the air bag 50 can be laterally spread out for packaging in a narrow area. Advantageously, the clamshell cover 60 permits greater flexibility in relative size of the canister 80 versus the clamshell cover 60 such that the clamshell cover 60 can be sized to exactly fit the desired size and packaging of the folded air bag 50 within a narrow vehicle 12 location. This advantageously allows a larger air bag 50 to be packaged in the module 30 by spreading it out over a greater lateral length without increasing the size of the hard rigid canister 80 which houses the inflator 40.

It will be understood that a person skilled in the art may make modifications to the preferred embodiment shown herein within the scope and intent of the claims. For example, although the clamshell cover 60 is shown as having two generally trapezoidal or rectangular halves 61, 62, it will be appreciated that the first and second halves 61, 62 may be virtually any geometric shape, so long as the first and second halves are pivotally connected by the hinge portion 63 and are movable between the open condition for easy molding and easy insertion of the air bag 50 and the closed condition for encapsulation of the air bag 50 therein. It will further be appreciated that while the hinge portion 63 is preferably shown as one continuous strip, the hinge portion 63 may also be discontinuous. While the first and second halves 61, 62 of the clamshell cover 60 are preferably rotatable approximately 180 degrees relative each other, it will be appreciated that the first and second halves 61, 62 may be rotatable more or less than 180 degrees relative each other, but are preferably rotatable at least 90 degrees relative each other for ease of assembly and manufacturing.

While the present embodiment has been described as carried out in a specific embodiment thereof, it is not intended to be limited thereby, but is intended to cover the invention broadly within the scope and spirit of the claims.

What is claimed is:

1. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover including first and second halves and a bendable hinge portion pivotally connecting the first and second halves, the first and second halves of the clamshell cover each including a mounting edge opposite the hinge portion and the mounting edges of the clamshell cover being securely connected to each other whereby upon air bag deployment, the air bag breaks open and deploys out through the hinge portion of the clamshell cover and the mounting edges remain secured to each other.

2. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover including first and second halves and a bendable hinge portion pivotally connecting the first and second halves, the first half of the clamshell cover including a first mounting portion opposite the hinge portion and the second half of the clamshell cover including a second mounting portion opposite the hinge portion and wherein the first and second mounting portions are at least partially secured to each other to close the clamshell cover, the first and second mounting portions each including an arcuate portion defining a clamshell opening through which inflator gas is received to inflate the air bag.

3. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover being integrally formed as one piece and including a first half and a second half, the clamshell cover including a bendable hinge portion pivotally connecting the first half and the second half prior to air bag deployment and the hinge portion being breakable upon deployment of the air bag such that the air bag deploys out through the hinge portion of the clamshell cover.

4. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover including first and second halves and the canister including means for clamping the first and second halves of the clamshell cover together.

5. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover including first and second halves and the canister including opposing arms and the air bag including a neck portion for receiving inflator gas therein and wherein the neck portion is captured between the first and second halves of the clamshell cover and wherein the first and second halves of the clamshell cover are captured between the arms of the canister to attach the air bag to the clamshell cover.

6. An air bag module comprising:

an inflator for generating gas;

an air bag deployable upon generation of gas by the inflator;

a canister housing the inflator; and a clamshell cover housing the air bag therein, the clamshell cover being connected to the canister, the canister including a pair of opposing arms and wherein the arms are pressed together to capture the air bag and the clamshell cover therebetween whereby the air bag and the clamshell cover are secured to the canister and to each other.

7. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover having an external surface including a plurality of outwardly projecting bosses thereon and the canister including a plurality of apertures thereon and wherein the bosses engage the apertures to align the canister relative to the clamshell cover.

8. An air bag module comprising:

an inflator for generating gas;

an air bag deployable upon generation of gas by the inflator;

a canister housing the inflator; and a clamshell cover housing the air bag therein, the clamshell cover being connected to the canister, the clamshell cover including a first half and a second half, the clamshell cover including a bendable hinge portion pivotally connecting the first half and the second half prior to air bag deployment and the hinge portion being breakable upon deployment of the air bag such that the air bag deploys out through the hinge portion of the clamshell cover.

9. An air bag module comprising:

an inflator for generating gas;

an air bag deployable upon generation of gas by the inflator, the air bag being operatively connected to the inflator for receiving inflator gas therein; and a clamshell cover housing the air bag therein, the clamshell cover including a first half and a second half, the clamshell cover including a bendable hinge portion pivotally connecting the first half and the second half prior to air bag deployment and the hinge portion being breakable upon deployment of the air bag such that the air bag deploys out through the hinge portion of the clamshell cover.

\* \* \* \* \*